US012084315B2

(12) United States Patent
Spencer

(10) Patent No.: US 12,084,315 B2
(45) Date of Patent: Sep. 10, 2024

(54) DEVICES AND METHODS FOR LIFTING PRECAST CONCRETE DOMES

(71) Applicant: Thomas Spencer, Bayport, NY (US)

(72) Inventor: Thomas Spencer, Bayport, NY (US)

( * ) Notice: Subject to any disclaimer, the term of this patent is extended or adjusted under 35 U.S.C. 154(b) by 990 days.

(21) Appl. No.: 17/023,223

(22) Filed: Sep. 16, 2020

(65) Prior Publication Data

US 2021/0078835 A1 Mar. 18, 2021

Related U.S. Application Data

(60) Provisional application No. 62/901,239, filed on Sep. 16, 2019.

(51) Int. Cl.
*B66C 1/10* (2006.01)
*B66C 1/62* (2006.01)
*B66C 1/66* (2006.01)

(52) U.S. Cl.
CPC .................. *B66C 1/66* (2013.01); *B66C 1/62* (2013.01); *B66C 1/105* (2013.01)

(58) Field of Classification Search
CPC .. B66C 1/22; B66C 1/42; B66C 1/422; B66C 1/44; B66C 1/442; B66C 1/54; B66C 1/56; B66C 1/66
USPC ......................................... 294/89, 91, 92, 93
See application file for complete search history.

(56) References Cited

U.S. PATENT DOCUMENTS 1,359,649 A * 11/1920 Allison ............... H01M 50/256 294/93
1,603,591 A * 10/1926 Ghetti ................... E04G 21/142 294/89
1,890,734 A 12/1932 Kuberka
3,259,421 A 7/1966 Davis et al.
3,528,126 A 9/1970 Ernst
3,583,753 A * 6/1971 McCrory .................. B66C 1/66 294/90
4,474,400 A 10/1984 Toffolon
4,838,595 A * 6/1989 Spillar ...................... B66C 1/66 294/90
5,820,186 A * 10/1998 Schmitz, Jr. .............. B66C 1/66 294/93
5,971,457 A 10/1999 Gallo, Jr.
6,439,632 B1 * 8/2002 Webber ..................... B66C 1/54 294/97
6,808,360 B1 * 10/2004 Patterson ................. B66C 1/66 294/93
6,988,714 B2 * 1/2006 O'Neill ..................... B66C 1/66 254/261

(Continued)

*Primary Examiner* — Dean J Kramer

(74) *Attorney, Agent, or Firm* — Daniel P. Burke & Associates, PLLC; Daniel P. Burke

(57) ABSTRACT

Devices and methods utilize a lifting beam comprising at least two connectors with a first connector substantially centered on the beam and a second connector disposed closer to an end of the beam which permit a heavy equipment operator to selectively change the vertical orientation of the lifting beam from a substantially horizontal position to a substantially vertical position. The lifting beam is selectively positionable by the equipment operator downwardly through the top opening of a precast, concrete dome without requiring the operator to leave the protection of the equipment cab. When positioned inside the concrete dome, the lifting beam is oriented substantially horizontally and the concrete dome can be lifted and repositioned by lifting the beam.

20 Claims, 14 Drawing Sheets

(56) References Cited

U.S. PATENT DOCUMENTS

| | | | | |
|---|---|---|---|---|
| 8,388,034 | B2 * | 3/2013 | Alba | B66C 1/66 294/215 |
| 8,550,517 | B1 | 10/2013 | Bates | |
| 2005/0200144 | A1 * | 9/2005 | Bell | B66C 1/16 294/89 |

* cited by examiner

DEVICES AND METHODS FOR LIFTING PRECAST CONCRETE DOMES

RELATED APPLICATION DATA

This application claims the benefit of U.S. Provisional Patent Application Ser. No. 62/901,239 filed on Sep. 16, 2019, which is hereby incorporated by reference.

Devices and methods for lifting and moving precast concrete domes use a lifting beam which is readily orientatable and positionable by the operator of an excavator or other heavy equipment without leaving the cab.

BACKGROUND

Precast concrete rings and domes provide an economical manner of installing a cesspool which is resistant to collapse. The concrete rings and domes need to be stored and moved between the time they are cast and through installation. These concrete domes, in particular, are heavy, can be difficult to move, and pose an inherent danger when suspended off the ground or another solid support. There is a need for devices and methods for moving precast concrete domes which is safe, efficient and relatively inexpensive.

SUMMARY

The disclosed devices and methods permit a heavy equipment operator to move a precast, concrete dome without leaving the protection of the equipment cab and without requiring the assistance of a second person on the ground. It will be appreciated that excavator cabs typically form a roll over protective structure and provide a degree of safety to the operator which is not provided if the operator is forced to leave the cab to perform. It will also be appreciated that the immediate area around heavy equipment can be dangerous and is best avoided during operation of the heavy equipment.

The methods comprise providing an excavator or other heavy equipment with a movable boom or bucket and a connected structure which is relatively movable relative to the boom or bucket. For example, an excavator having a bucket with a movable claw pivotally attached to the bucket and selectively movable relative to the bucket is suitable.

The methods also comprise providing a lifting beam comprising at least two connectors with a first connector substantially centered on the beam and a second connector disposed closer to an end of the beam. The beam is connected to the bucket in a manner which allows the operator to move the beam and change the orientation of the beam between a substantially horizontal orientation and a substantially vertical orientation so that the beam can be lowered into the top opening of the concrete dome. The chain or other strong, and preferably flexible, support is used to connect the bucket or boom to the first connector on the beam. When suspended from the first connector, the beam will tend to assume a generally horizontal position since the first connector is substantially centered on the beam. A second flexible support, such as a cable connects the second connector on the beam to the movable structure on the boom/beam, e.g. the movable claw. By moving the claw relative to the bucket, the second connector can be moved generally vertically relative to the first connector to change the orientation of the beam to a more vertical orientation.

The lifting beam is dimensioned to be lowered into the opening in the top of a precast concrete dome. By easing the tension on the cable attached to the second connector, the beam is then repositioned substantially horizontally inside and across the interior of the dome such that the lifting beam spans the interior of the dome. With the lifting beam properly positioned across the interior of the precast dome, the dome can be raised and repositioned by the backhoe or other equipment. After the dome has been moved to the desired location, the lifting beam is readily removed from the interior of the dome by lowering the beam further into the dome and tensioning the cable to orient the beam in a substantially vertical orientation.

DETAILED DESCRIPTION

The various aspects described below are a lifting beam particularly suited for lifting a precast concrete dome, apparatus for lifting a precast concrete dome and methods of lifting a precast concrete dome. Precast concrete domes typically weigh more than 3,000 lbs, for example, 3,500-3,800 lbs, are generally conically shaped, are generally hollow, and have a top opening which is typically roughly circular. The interior surface of the dome is generally curved and slopes away in the downward direction. In other words, the interior wall surface of a portion of a concrete dome is further away from the corresponding opposite interior surface of the dome, when measured by a diameter passing through an imaginary vertical axis (axis of the cone) of the dome (herein referred to as "opposite interior surfaces"), than the interior walls of a higher portion of the concrete dome. Reference to higher or lower herein refer to the dome and other parts when oriented in the manner shown in the illustrations. In light of the conical shape of a dome, the distance between opposite interior sides of the dome is also greater than the span or diameter defined by the top opening. The various embodiments utilize a lifting beam which is longer than the span of the top opening of the dome and is shaped and dimensioned to contact opposite interior surfaces of a dome. As described and shown in the illustrations, the lifting beam is adapted to be oriented sufficiently vertically and lowered down through the top opening of the concrete dome and then reoriented to a substantially horizontal position and lifted to a position where the ends of the lifting beam contact opposite interior surfaces of the concrete dome. The lifting beam is then in position for lifting and otherwise changing the location of the concrete dome.

One preferred embodiment of a lifting beam is illustrated in conjunction with an excavator. The lifting beam is intended for use with a piece of heavy equipment, such as a backhoe, excavator or other suitable heavy equipment. While the illustrated excavator has a vertically movable lifting arm formed by various components including the boom, stick and bucket, the lifting beam and methods can also be used/performed with a suitable winch arrangement.

Figure 1:
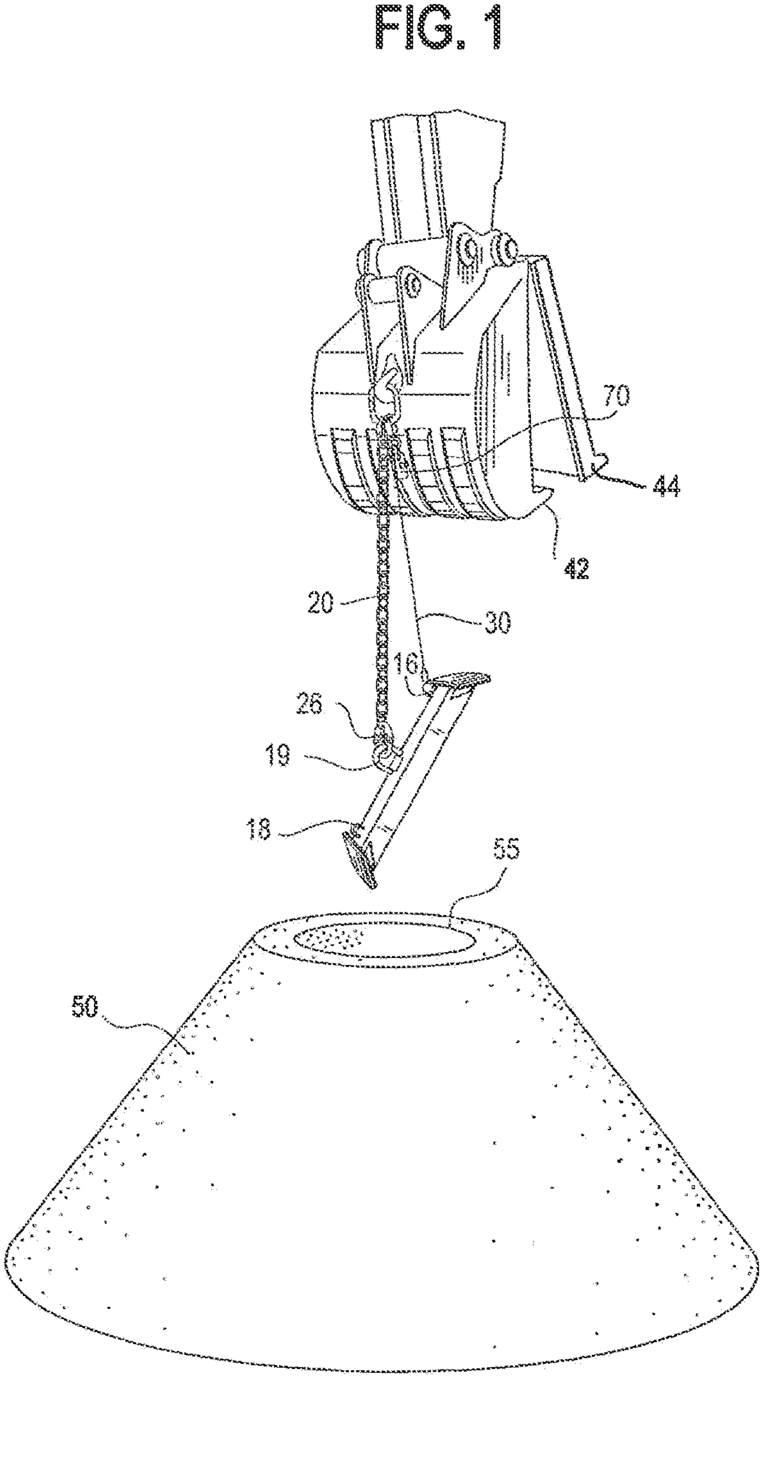
FIG. 1 is a partial, perspective view of a lifting beam suspended from the bucket of an excavator over a precast concrete dome.

FIG. 1 shows one exemplary lifting beam 10 supported above the top opening of a precast concrete dome 50 by a chain 20 connected to the bucket 40 of an excavator (not fully shown). The bucket 40 has a scoop portion 42 and a relatively movable claw portion 44 which is movable relative to the scoop portion 42. A chain 20 is shown supporting lifting beam 10. A master link 26 on the bottom of chain 20 is connected to a D-ring 19 which is pivotally fastened to the lifting beam 10 with a welded connection.

The illustrated embodiment utilizes an orientation cable 30 to change the vertical orientation of lifting beam 10. In the illustrated embodiment, one end of a wire cable 30 is connected to a lifting loop 16 on lifting beam 10. The other end of wire cable 30 is free and is readily connectable to the claw 44 portion of bucket 40. The free end of cable 30 is also preferably provided with an oblong master link 66 of the type shown in FIG. 8. With a master link 66 on the free end of cable 30, the free end can be readily attached and detached to a claw tooth 46 of bucket 40. When the free end of cable is attached to a claw 46, movement of the claw portion 44 of the bucket 40 changes the vertical orientation of the lifting beam 10. The ends of cable 30 are preferably connected to the respective lifting loop 16 and master link 66 utilizing cable thimbles and cable clamps. For example, each end of cable 30 is preferably provided with a thimble and cable clamps. The thimbles are positioned through lifting loop 16 and master link 66. The cable 30 is wrapped around each thimble and secured to itself with cable clamps. FIG. 1 shows the lifting beam 10 suspended at an angle above the precast concrete dome 50.

Figure 2:
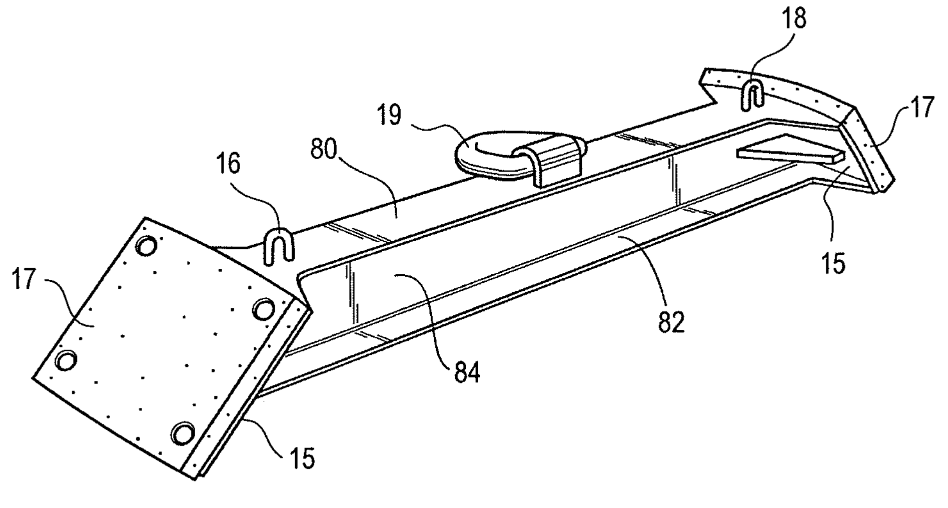
FIG. 2 is a perspective view of a lifting beam.
Figure 3:
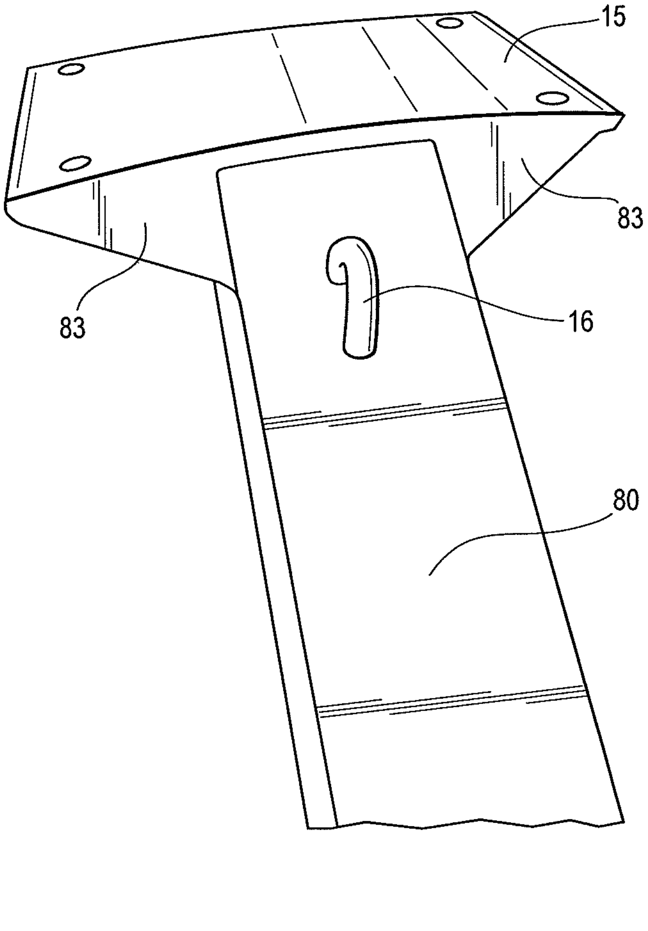
FIG. 3 is a top, partial perspective view of a first end of a lifting beam without cushioning pads.
Figure 4:
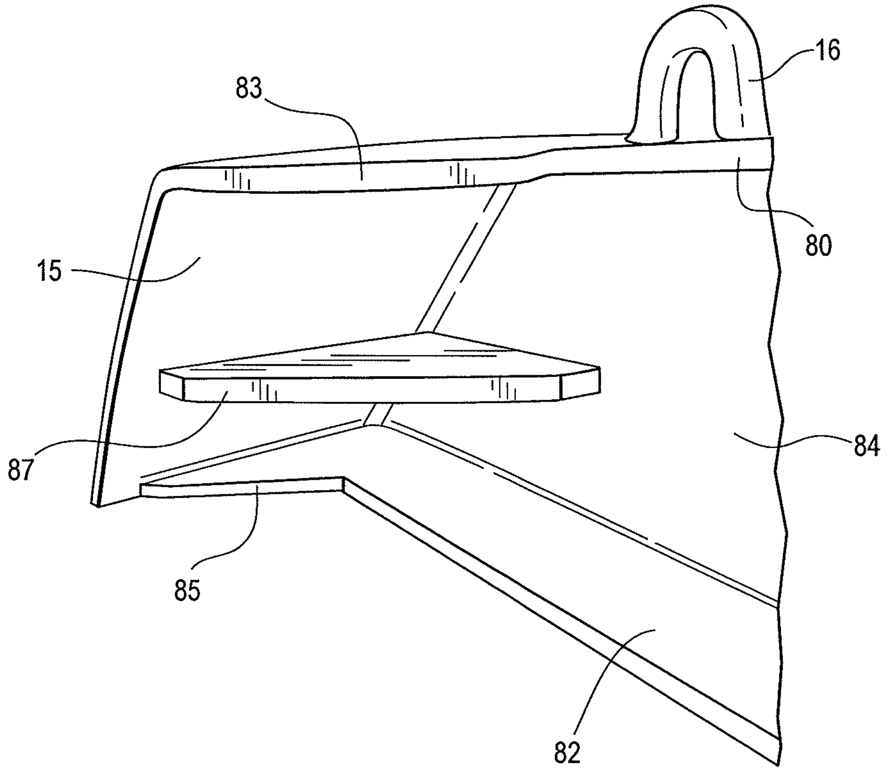
FIG. 4 is a side, partial perspective view of a first end of a lifting beam without cushioning pads.

The illustrated lifting beam 10 is shown in greater detail in FIGS. 2-6. With reference to FIG. 2, this illustrated lifting beam 10 has a body formed from or generally similar to an I-beam with an upper flange 80, a web 84, and a lower flange 82. As shown in FIG. 3, a first connector loop 16 is positioned on the top and toward a first end of upper flange 80. FIG. 3 also illustrates the curvature of the outer surface of end plate 15. End plates 15 are preferably curved and slope outwardly in the downward direction to conform to the curvature and slope of the interior surfaces of a concreted dome.

With reference to FIGS. 2 and 3, an end plate 15 is secured to each end of the beam body, preferably by welding. In order to strengthen the connection of the end plates 15 to the lifting beam body in this illustrated embodiment, pairs of gussets are provided between the end plate 15 and each of the upper flange 80, a web 84, and a lower flange 82. Specifically, upper gussets 83 are provided between upper flange 80 and end plates 15, middle gussets 87 are provided between web 84 and end plate 15, and lower gussets 85 are provided between lower flange 82 and end plate 15. Other versions employ different numbers of gussets, e.g. two or four.

Figure 5:
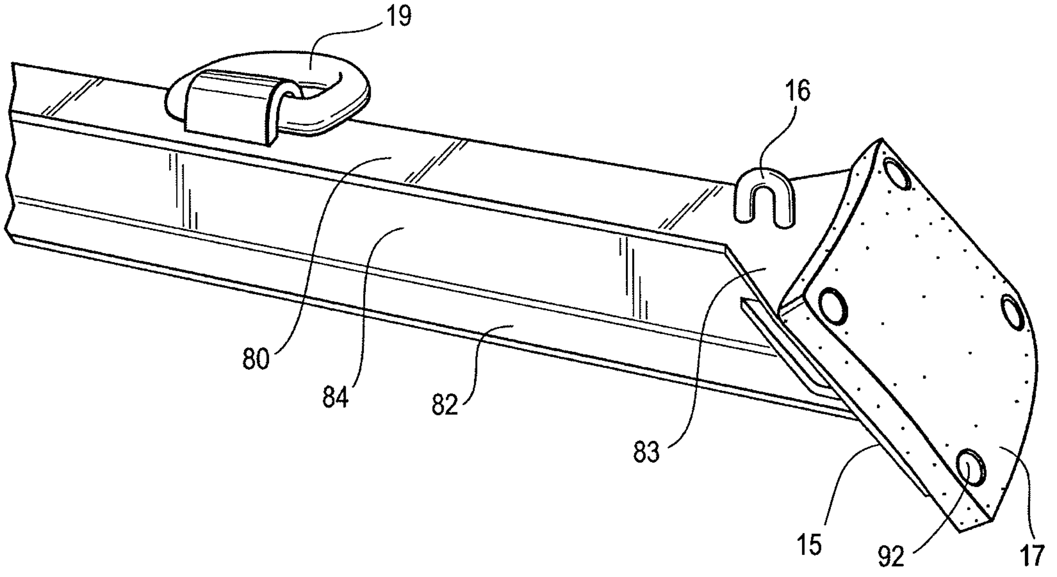
FIG. 5 is a partial perspective view of a lifting beam.
Figure 6:
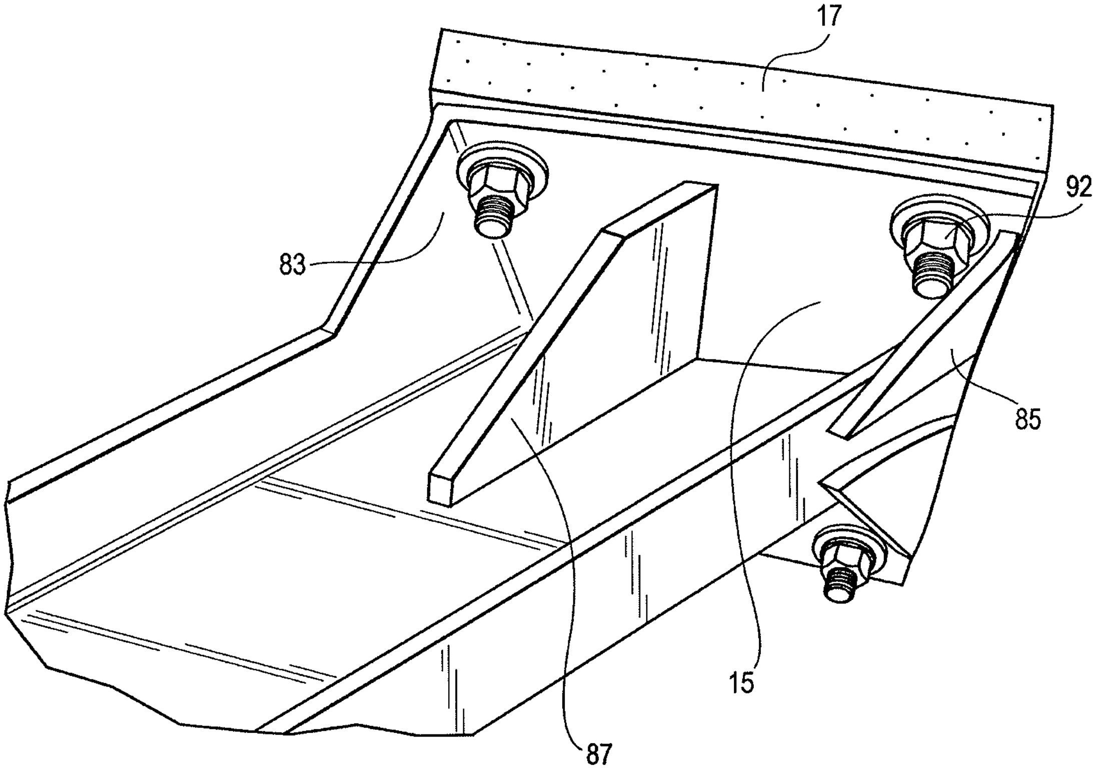
FIG. 6 is a bottom, partial perspective view of a first end of a lifting beam.

As shown in FIGS. 2 and 5, a D-ring 19 is pivotally connected to top flange 80 with a welded loop. FIGS. 5 and 6 also show cushioning pads 17 secured to both end plates 15. Cushioning pads 17 can be formed of a durable rubber-like material or other material designed to minimize the risk of damage to the interior surface of the concrete dome. Pads 17 are secured to end plates 15 with bolts and nuts. Other suitable fasteners can be used.

Figure 7:
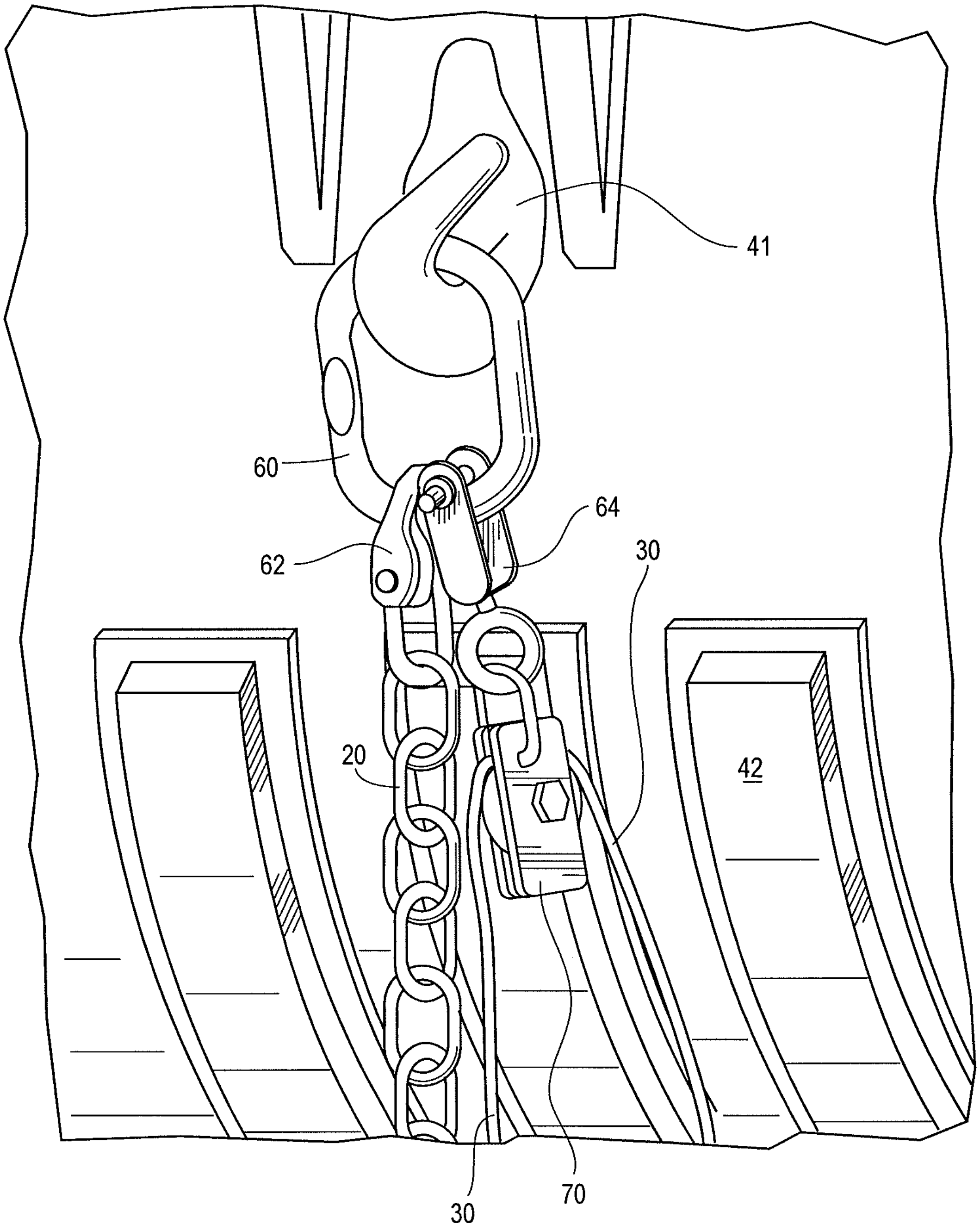
FIG. 7 is a close up, partial perspective view of a block and lifting connector connected to a bucket.

FIG. 7 illustrates the connections and links on the back of the scoop portion 42 of bucket 40. An oblong master link 60 is looped over a hook 41 which is welded to the back of scoop portion 42. A first coupling link 62 connects chain 20 to master link 60. A second coupling link 64 connects block 70 to hook 41. Block 70 guides cable 30 in a generally vertical direction as it passes upwardly from first connector 16 toward the bucket 40 and then toward the movable claw portion 44 of bucket 40. It will be appreciated that other connections and other types of connectors can be substituted for those illustrated and described.

In the illustrated embodiment, the connector 16 is raised and lowered to change the vertical orientation of the lifting beam. In an alternative embodiment, the D-ring 19 could be extended and retracted while maintaining a constant length of the cable 30 to change the orientation of the lifting beam.

Figure 8:
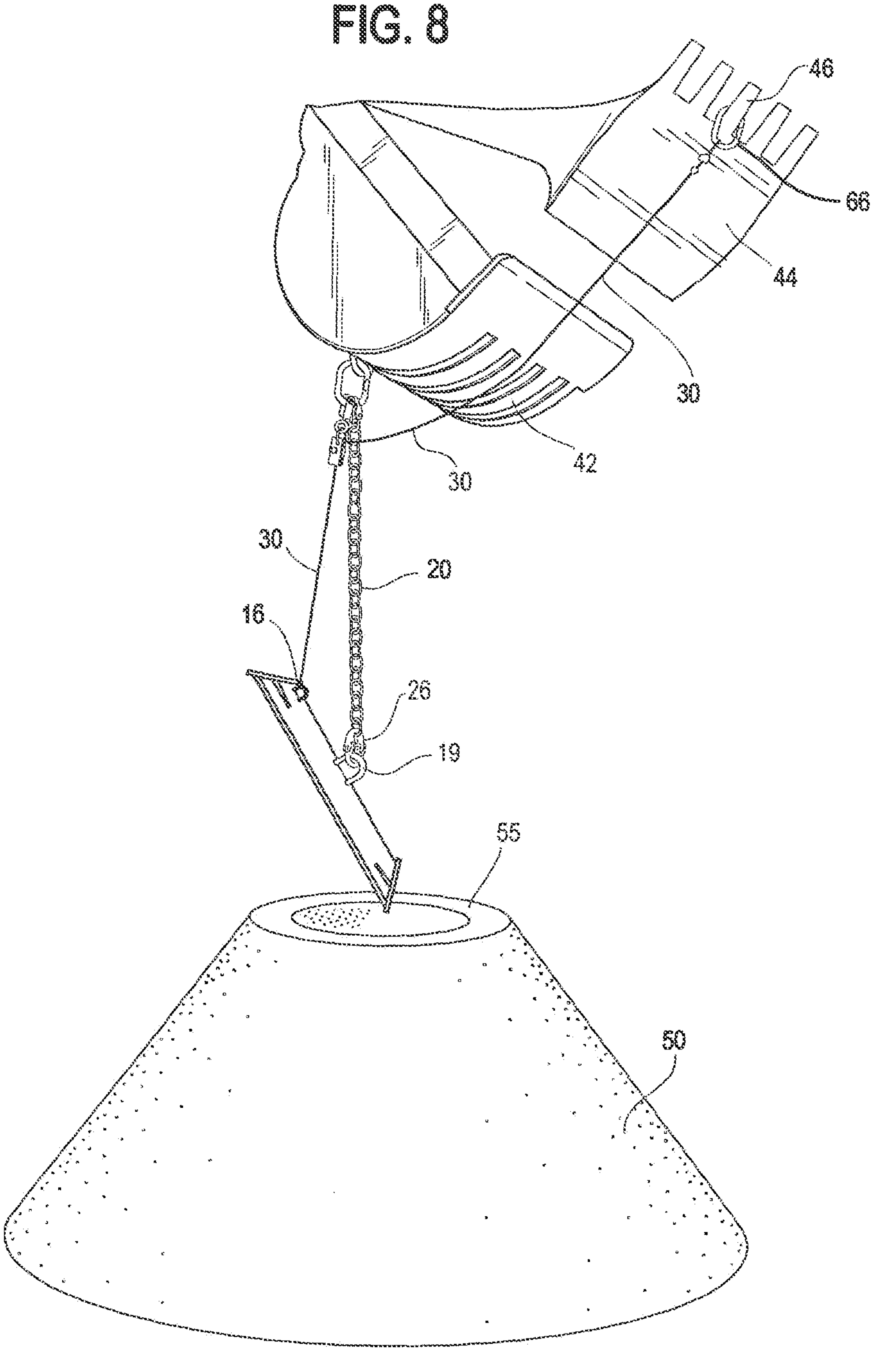
FIG. 8 is a partial perspective view of a lifting beam and bucket during vertical reorientation of the lifting beam.
Figure 9:
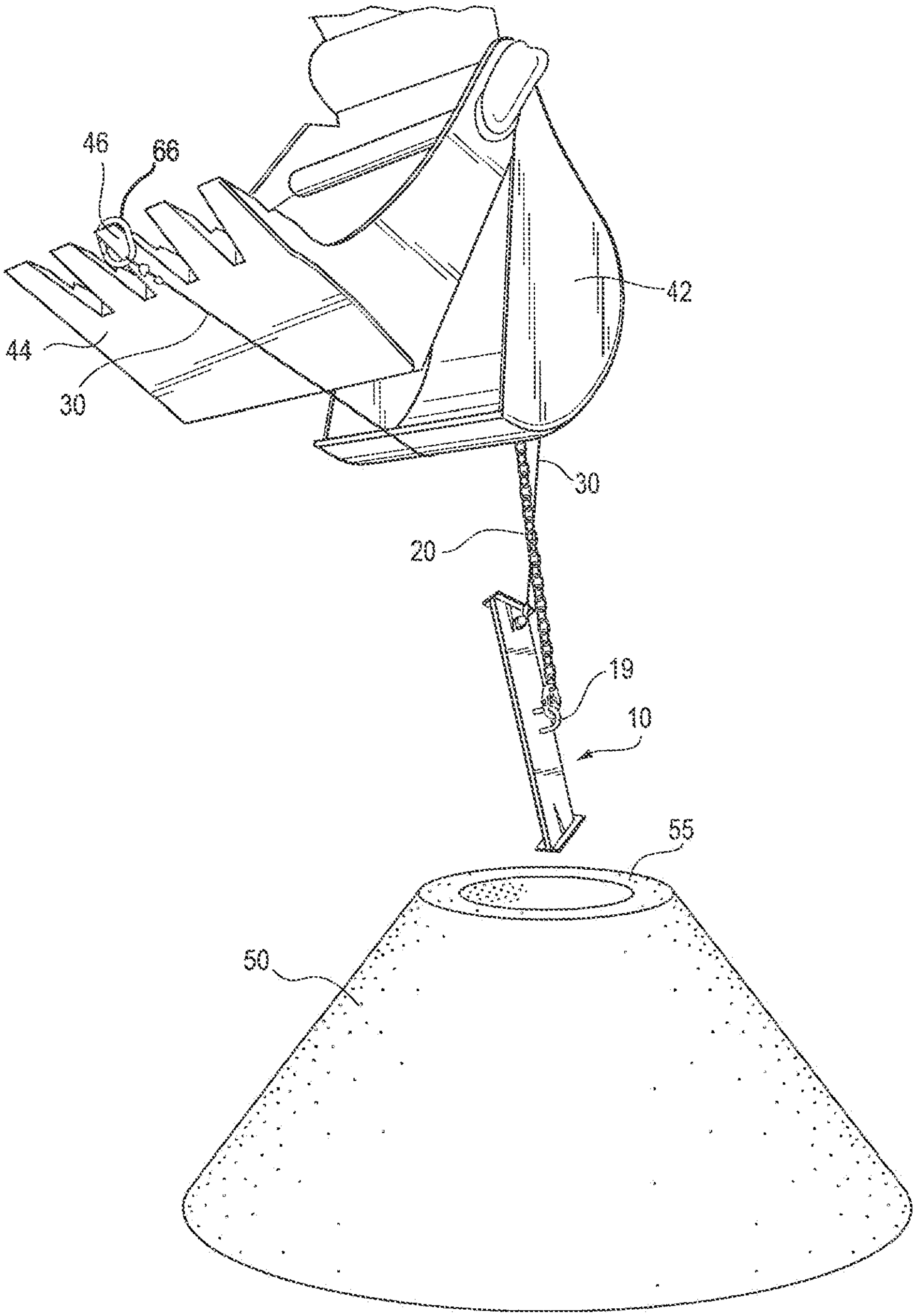
FIG. 9 is a partial perspective view of a lifting beam and bucket with the lifting beam in a substantially vertical orientation.

FIG. 8 shows a lifting beam which is being reoriented from a horizontal orientation to an insertion orientation. FIG. 9 shows the master link 66 on the free end of cable 30 looped over one of the claws 46 of claw portion 44. In FIG. 9, the claw portion 44 is opened slightly more than as shown in FIG. 8 so the lifting beam shown in FIG. 9 is oriented more vertically than the lifting beam shown in FIG. 8. With the lifting beam oriented sufficiently vertically, it is in the insertion orientation and can be lowered downwardly through the top opening of concrete dome. After the lifting beam is lowered through the top opening, the tension on cable 30 is relaxed by moving the claw portion 44 of bucket 40 to the closed position shown in FIG. 14. With no tension on cable 30, the only upward force on lifting beam 10 is provided by the lifting chain 20. Since the lifting chain 20 is connected near the center of lifting beam 10, the lifting beam will assume a generally horizontal position. It is not necessary that lifting beam be perfectly horizontal. With the lifting beam 10 in the horizontal position, the chain is raised slightly to bring the ends of the lifting beam 10 into contact with opposite interior surfaces of the concrete dome. Further lifting of the chain 20 will lift the dome.

Figure 10:
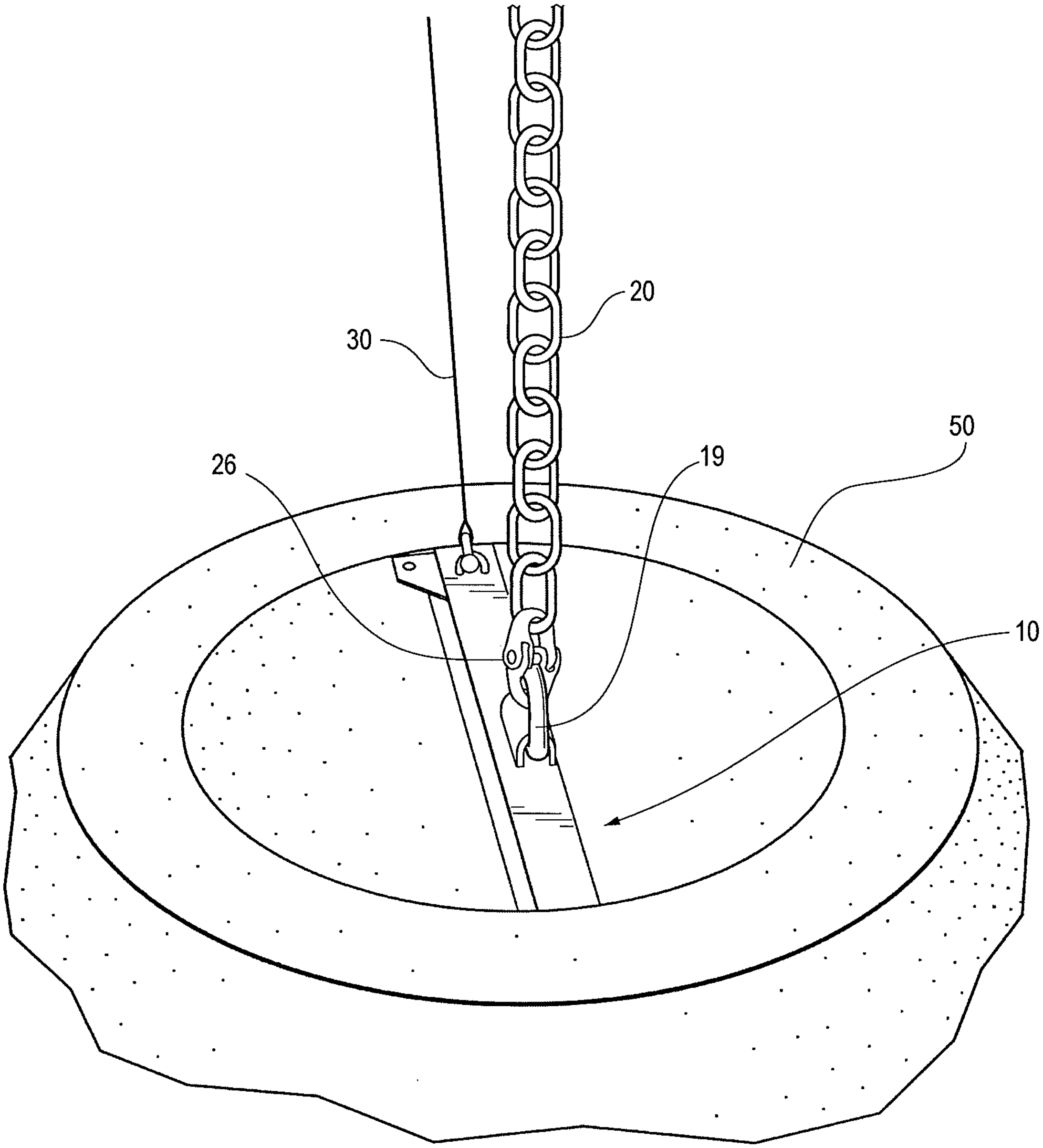
FIG. 10 is a partial, top perspective view of a lifting beam positioned horizontally inside a precast concrete dome.
Figure 11:
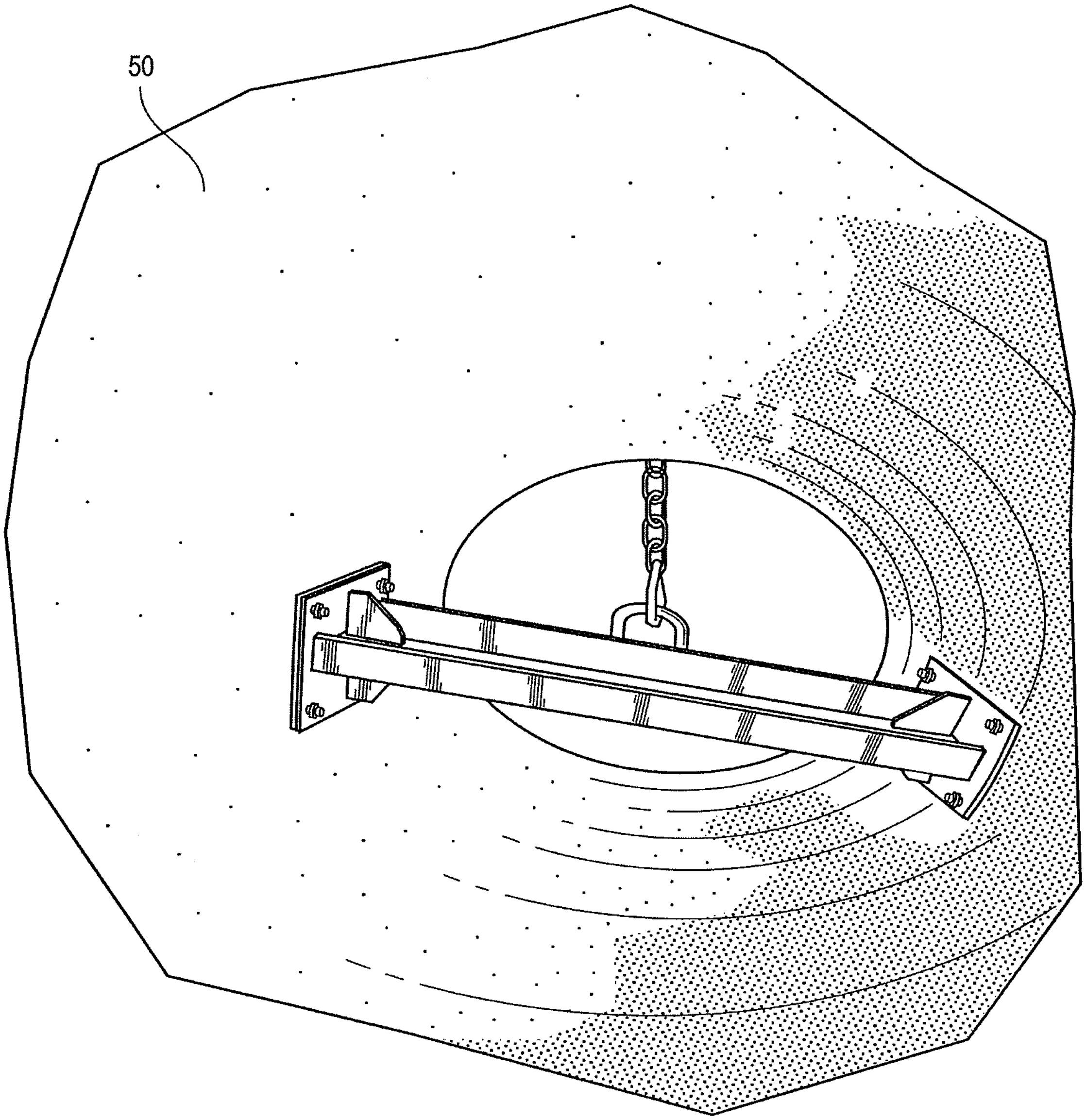
FIG. 11 is a partial, bottom perspective view of a lifting beam positioned horizontally inside a precast concrete dome.

FIGS. 10 and 11 are top and bottom perspective views, respectively, of a lifting beam positioned inside the concrete dome 50 which is now ready for lifting.

Figure 12:
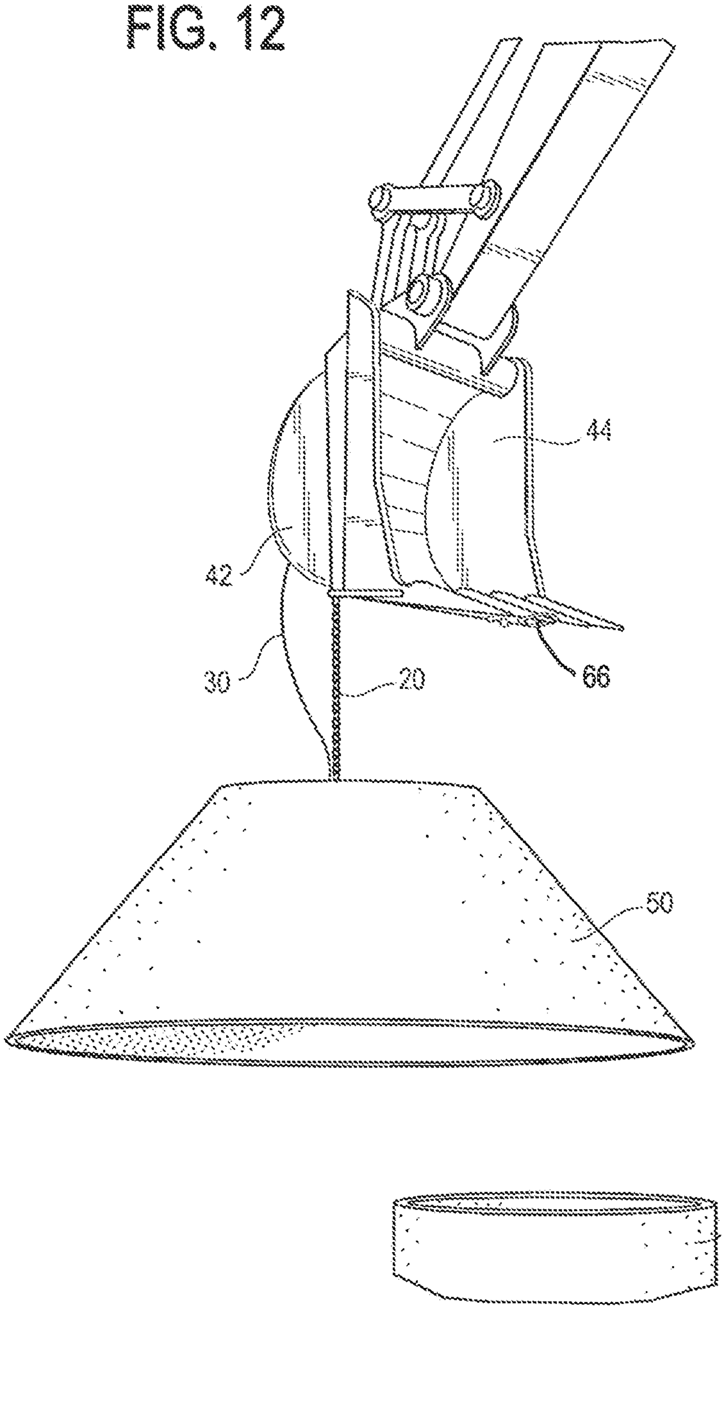
FIG. 12 is a partial perspective view of an excavator lifting a precast concrete dome.
Figure 13:
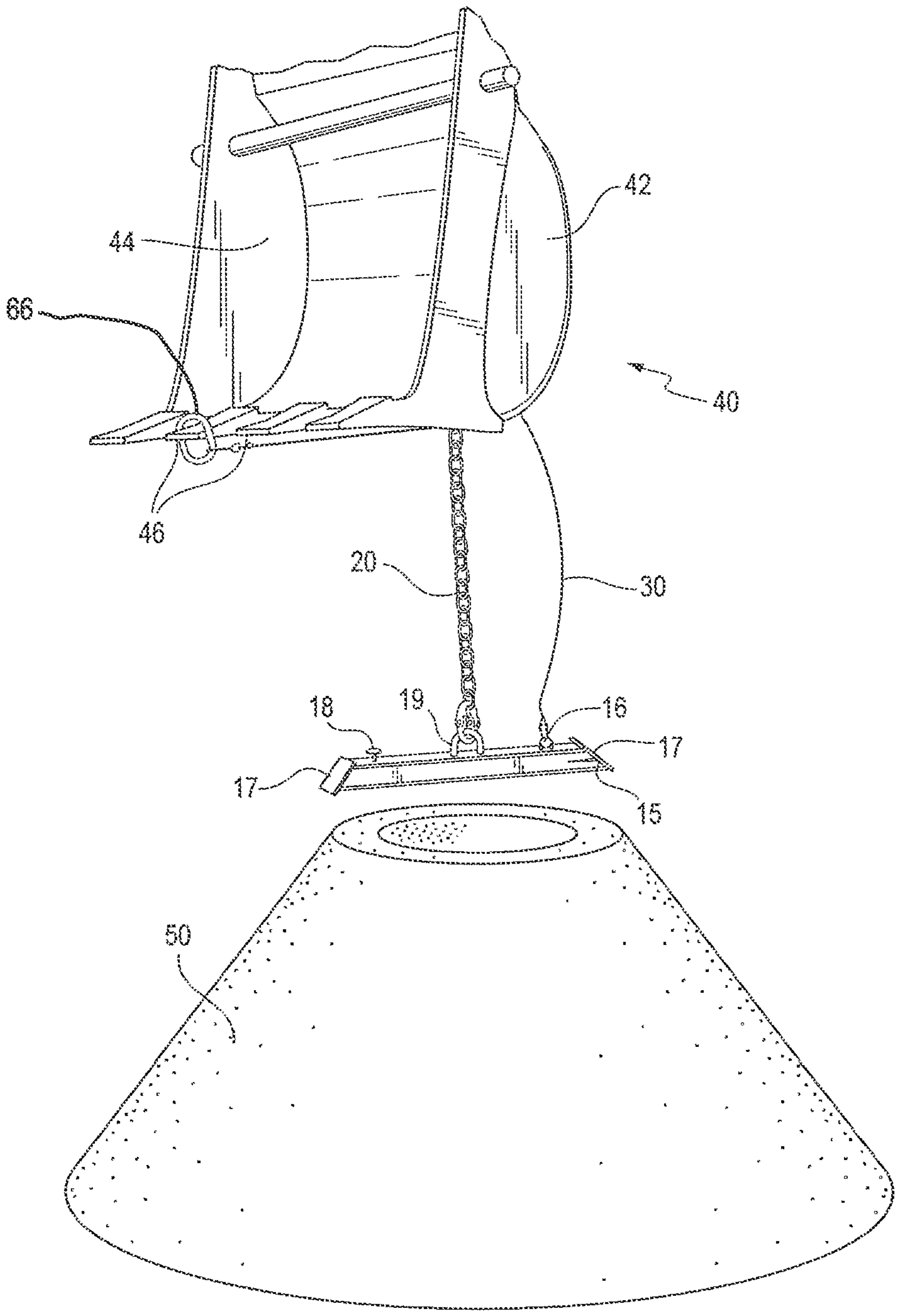
FIG. 13 is a partial, perspective view of an excavator supporting a lifting beam in a horizontal position over a precast concrete dome.

FIG. 12 shows a concrete dome which has been lifted by an excavator using lifting beam 10. After the concrete dome has been moved to the desired position, the lifting beam can be removed by lowering chain 20 sufficiently to allow the beam to break contact with the interior surfaces of the dome. By re-tensioning cable 30, the lifting beam can again be oriented in a substantially vertical position and lifted out of the interior of the concrete dome. FIG. 13 shows a lifting beam 10 which has been returned to a horizontal orientation outside of concrete dome.

Figure 14:
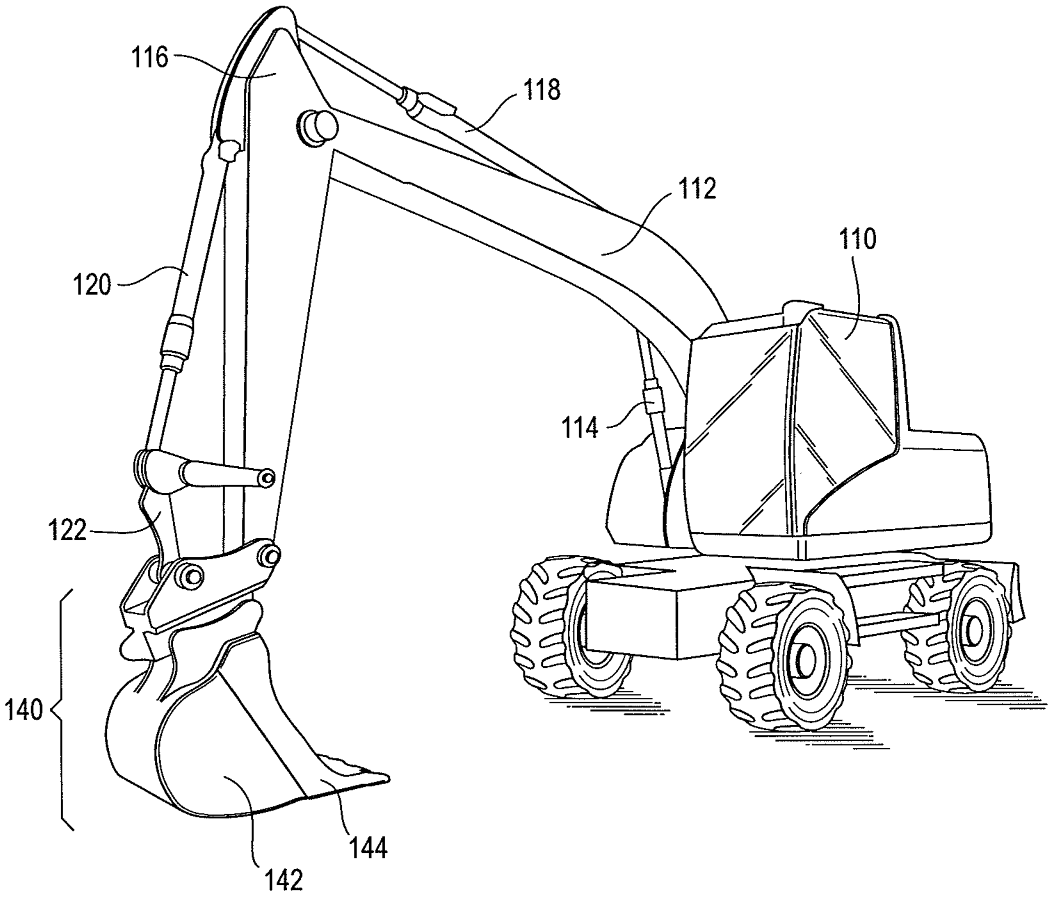
FIG. 14 PRIOR ART
FIG. 14 is a perspective view of an exemplary heavy equipment (excavator) of the prior art which is usable with the lifting beam to practice the methods of the present invention.

FIG. 14 shows one example of a piece of heavy equipment which can be used to raise, lower and orient a lifting beam. The illustrated excavator has a cab 110, boom 112, boom hydraulic cylinder 114, stick 116, stick hydraulic cylinder 118, bucket 140 including scoop portion 142 and claw portion 144, bucket hydraulic cylinder 120 and bucket linkage 122.

The various components illustrated are provided to show one example of suitable components. Chain 20 is selected to support the desired loads to be supported. For example, for precast domes having a weight of about 3,500-3,800 lbs, a 4' length of ⅜" chain having a work load limit of 6,600 lbs or 8,800 lbs is deemed suitable. Chain 20 is provided with connectors at both ends, e.g. ½" coupling links, each having a work load limit of 15,000 lbs. Chain 20 can be secured to the bucket of an excavator with a ¾" Oblong Master Link having a work load limit of 9,900 lbs at 60 degrees. Another master link 26 of the same type is used at the bottom of chain 20 to connect the chain 20 to the D-ring 19 on the lifting beam 10. A third master link 66 is connected to the free end of the cable 30 to allow easy attachment and detachment of the cable 30 from a tooth 46 of the claw portion 44 of bucket 40. All of these components are suitable for lifting a precast concrete dome weighing about 3,500 to about 3,800 lbs. In the illustrated example, a pulley block 70 is also attached to the master link. In this illustrated embodiment, cable 30 is not bearing the full weight of the concrete dome so the components are not required to be as robust. Cable 30, which extends from lifting loop 16 through the pulley block 70 and then to one of teeth 46 of claw portion 44, can be a ¼ inch cable formed of 304 Stainless steel with a work load limit of 1,280 lbs. As noted above, wire thimbles and cable clamps are suitable for connecting the cable 30 to the lifting loop 16 and the master link 66. Wire rope thimbles capable of receiving a rope diameter of 9⁄32-5⁄16 inches formed of 302/304 stainless steel are suitable. Cable clamps formed of 304 stainless steel with a rope turn back of 4¾ inches are suitable for the described cable. It is preferable to use at least three cable clamps for each connection.

Opening the claw portion 44 pulls the connected cable 30 and thereby lifts lifting loop 16 relative to D-ring 19 thereby changing the orientation of lifting beam 10. In the illustrated embodiment, it only takes about 18"-20" of movement of cable 30 to orient lifting beam 10 to a more vertical orientation suitable for lowering through the top opening 55 in dome 50. The lifting beam 10 is then lowered through opening 55 and the claw portion 44 is closed relative to scoop portion 42 in order to remove the tension on cable 30 and allow lifting beam 10 to return to its generally horizontal orientation. Then chain 20 is lifted to position lifting beam 10 against the interior sides of dome 50.

If the equipment being used to lift the dome does not have at least a two-piece jaw like the bucket 40 illustrated or another relatively movable element, such as a thumb, then a long piece of rope, e.g. ¼" rope, can be looped through the pulley block and used to manually change the orientation of lifting beam 10 when desired.

After the dome has been moved to the desired position, chain 20 is lowered in order to allow the lifting beam 10 to move lower into the interior of the dome. The cable 30 is then again tensioned in order to reorient the lifting beam 10 to a more vertical position and the chain 20 is then raised to remove the lifting beam 10 from the dome.

The illustrated lifting beam has a second connector loop 18 which provides added flexibility during use. A rope, cable, chain or similar device can be connected to second loop 18 when desired to permit additional manual movement of the lifting beam.

The illustrated lifting beam is formed of a material which is strong enough to support the desired loads of the precast concrete domes. For example, the lifting beam can be constructed using a piece of I-beam which is about 3" wide and 4" high having a 5⁄16 inch thick web and a ¼ inch thick top and bottom flanges. The lifting beam has a top and a bottom. The ends of the beam are angled to conform to the sloping interior surface of the dome, e.g. at an angle of about 45 degrees, so that the top of the beam is shorter, e.g. 30½ inches, than the bottom of the beam, e.g. about 39-40 inches. Arcuate metal end plates in the general shape of the interior surface of the dome to be lifted are preferably connected, e.g. by welding, to both ends of the lifting beam. The end plates are reinforced with bracing gussets. The end plates are designed to be sturdy and durable for lifting domes, e.g. 6"×8" plates formed from 3⁄16 inch steel. The outer surfaces of each plate are preferably cushioned with suitable material, e.g. with ½ or ¾ inch rubber pads, also measuring 6"×8", fastened to the end plates, e.g. with 5⁄16" carriage bolts. The ends of the flanges on the lifting beam are also cut to a radius in order to conform to the rounded, horizontal cross-section of the dome. With the end plates and cushions, the top of the described example of a lifting beam has a length of about 32 inches while the bottom has a length of about 41 inches.

The top center of the lifting beam is used as the main lifting point and as a place for connecting a lifting chain. The illustrated lifting beam comprises a D-ring, e.g. a ⅝" inch D-ring, which is connected via a welded loop to the top flange proximate the middle of the beam. It is preferred that the main lifting point is at or near the center of the lifting beam since the lifting beam will be balanced and will naturally position itself substantially horizontally when suspended from its midpoint, e.g. by a chain connected to the D-ring.

A lifting loop is secured to a top, first end portion of the lifting beam, preferably about 2" from the end of the beam. The lifting loop is dimensioned to receive a small orientation cable, e.g. a ¼" cable, which is used to reorient the lifting beam from its natural, generally horizontal position to a more vertical orientation when the lifting beam is being lowered into or withdrawn from the interior of the precast dome. The orientation of the lifting beam is made more vertical by pulling upwardly on the orientation cable. The lifting beam is returned to the generally horizontal position by relaxing the tension on the orientation cable.

In another embodiment, a rotation line can be attached to a second loop 18 secured to the top of a second end portion of the lifting beam 10. The rotation line can be a rope or cable, e.g. a ⅜" rope. The rotation line can be used for rotating the lifting beam when it is freely suspended from the main lifting point. For example, when a dome is suspended, it may be desirable to rotate the dome in order to position the dome in a desired position and orientation. The rotation line facilitates rotating a suspended dome.

Another aspect comprises a lifting apparatus comprising a piece of heavy equipment, such as a backhoe or excavator comprising a selectively movable lifting arm and a second component which is selectively movable relative to the lifting arm. The heavy equipment is used in conjunction with a lifting beam dimensioned to lift a conical, precast concrete dome comprising a generally longitudinal body comprising a top, a bottom, a first end and a second end opposite the first end, a middle equidistant from the first end and the second end, and a center portion proximate the middle; a first connector disposed on the top of the body proximate the center portion; a second connector disposed on the top of the body, the second connector spaced from the middle by a distance which is greater than the distance the first connector is spaced from the middle; the first end and the second end comprising curved outer surfaces, each of the curved outer surfaces comprising an upper edge and a lower edge, the curved outer surfaces slope outwardly so that the distance between the upper edges of the curved outer surfaces is less than the distance between the lower edges of the curved outer surfaces; a first support for connecting the first connector of the lifting beam to the movable arm; and an orientation connector for connecting the second connector of the lifting beam to the second component of the heavy equipment. In one version, the first support comprises a chain. In one version, the orientation connector comprises a cable. In one version, the lifting arm and the lifting beam have a load bearing capacity of at least 3,000 pounds. In one version, the lifting beam comprises a curved end plate welded to each of the first end and the second end of the longitudinal body. In one version, the curved end plates are each supported on the longitudinal body by at least four gussets. In one version, the lifting beam further comprises cushioning pads secured to the curved end plates.

Another aspect comprises a method of lifting a precast concrete dome comprising a generally circular top opening defining an opening span, comprising the steps of providing a heavy equipment comprising a selectively lifting arm and a second component which is selectively movable relative to the lifting arm; providing a lifting beam dimensioned to lift a conical, precast concrete dome comprising a generally longitudinal body comprising a top, a bottom, a first end and a second end opposite the first end, a middle equidistant from the first end and the second end, and a center portion proximate the middle, the first end of the body spaced from the second end of the body by a distance greater than the opening span; a first connector disposed on the top of the body proximate the center portion; a second connector disposed on the top of the body, the second connector spaced from the middle by a distance which is greater than the distance the first connector is spaced from the middle; connecting the first connector of the lifting beam to the lifting arm; connecting the second connector of the lifting beam to the second component of the heavy equipment; orienting the lifting beam into an insertion orientation which is sufficiently vertical so that the beam can be lowered into the interior of the concrete dome without contacting the top opening; changing the orientation of the lifting beam to a lifting orientation which is more horizontal than the insertion orientation by moving the second component; and raising the first connector to lift the lifting beam and the precast concrete dome.

In one version, the step of providing heavy equipment comprises providing a vertically movable lifting arm. In one version, the step of providing heavy equipment comprises providing a lifting arm and a winch, and the step of connecting the first connector to the lifting arm comprises connecting the first connector to a flexible support connected to the winch.

In one version, the step of providing a lifting beam comprises providing a lifting beam with the first end and the second end comprising curved outer surfaces, each of the curved outer surfaces comprising an upper edge and a lower edge, the curved outer surfaces slope outwardly so that the distance between the upper edges of the curved outer surfaces is less than the distance between the lower edges of the curved outer surfaces.

The invention claimed is:

1. A lifting beam dimensioned to lift a conical, precast concrete dome comprising:

a generally longitudinal body comprising an upwardly facing top, a bottom, a first end and a second end opposite said first end, a middle equidistant from said first end and said second end, and a center portion proximate said middle;

a first connector disposed on said top of said body proximate said center portion adapted to receive a generally vertical lifting force capable of lifting said body, said first connector permitting reorientation of said body from a substantially horizontal orientation to a substantially vertical orientation while a lifting force is applied to said first connector;

a second connector disposed on said top of said body, said second connector spaced from said middle by a distance which is greater than the distance said first connector is spaced from said middle;

said first end and said second end comprising curved outer surfaces, each of said curved outer surfaces comprising an upper edge and a lower edge, said curved outer surfaces slope outwardly so that the distance between said upper edges of said curved outer surfaces is less than the distance between said lower edges of said curved outer surfaces;

said body selectively movable between a substantially horizontal orientation and a substantially vertical orientation by the selective application and removal of a substantially vertical force on said second connector while a lifting force is being applied to said first connector and independently of a lifting force applied to said first connector.

2. A lifting beam dimensioned to lift a conical, precast concrete dome according to claim 1 wherein said longitudinal body comprises a web, an upper flange and a lower flange.

3. A lifting beam dimensioned to lift a conical, precast concrete dome according to claim 2 comprising a curved end plate welded to each of said first end and said second end of said longitudinal body.

4. A lifting beam dimensioned to lift a conical, precast concrete dome according to claim 3 wherein said curved end plates are each supported on said longitudinal body by at least two gussets.

5. A lifting beam dimensioned to lift a conical, precast concrete dome according to claim 3 wherein said curved end plates are each supported on said longitudinal body by at least four gussets.

6. A lifting beam dimensioned to lift a conical, precast concrete dome according to claim 3 wherein said curved end plates are each supported on said longitudinal body by at least six gussets.

7. A lifting beam dimensioned to lift a conical, precast concrete dome according to claim 3 further comprising cushioning pads secured to said curved end plates.

8. A lifting beam dimensioned to lift a conical, precast concrete dome according to claim 7 wherein said first connector has a load bearing capacity of at least 3,000 pounds.

9. A lifting beam dimensioned to lift a conical, precast concrete dome according to claim 1 wherein said first connector has a load bearing capacity of at least 3,000 pounds.

10. A lifting apparatus comprising:

a heavy equipment comprising a selectively movable lifting arm and a second component which is selectively movable relative to said lifting arm;

a lifting beam dimensioned to lift a conical, precast concrete dome comprising:

a generally longitudinal body comprising a top, a bottom, a first end and a second end opposite said first end, a middle equidistant from said first end and said second end, and a center portion proximate said middle;

a first connector disposed on said top of said body proximate said center portion;

a second connector disposed on said top of said body, said second connector spaced from said middle by a distance which is greater than the distance said first connector is spaced from said middle;

said first end and said second end comprising curved outer surfaces, each of said curved outer surfaces comprising an upper edge and a lower edge, said curved outer surfaces slope outwardly so that the distance between said upper edges of said curved outer surfaces is less than the distance between said lower edges of said curved outer surfaces;

a first support for connecting said first connector of said lifting beam to said movable arm; and an orientation connector for connecting said second connector of said lifting beam to said second component of said heavy equipment.

11. A lifting apparatus according to claim 10 wherein said first support comprises a chain.

12. A lifting apparatus according to claim 10 wherein said orientation connector comprises a cable.

13. A lifting apparatus according to claim 10 wherein said lifting arm and said lifting beam have a load bearing capacity of at least 3,000 pounds.

14. A lifting apparatus according to claim 10 wherein said lifting beam comprises a curved end plate welded to each of said first end and said second end of said longitudinal body.

15. A lifting apparatus according to claim 14 wherein said curved end plates are each supported on said longitudinal body by at least four gussets.

16. A lifting apparatus according to claim 14 wherein said lifting beam further comprises cushioning pads secured to said curved end plates.

17. A method of lifting a precast concrete dome comprising a generally circular top opening defining an opening span, comprising the steps of:

providing a heavy equipment comprising a selectively movable lifting arm and a second component which is selectively movable relative to said lifting arm;

providing a lifting beam dimensioned to lift a conical, precast concrete dome comprising:

a generally longitudinal body comprising a top, a bottom, a first end and a second end opposite said first end, a middle equidistant from said first end and said second end, and a center portion proximate said middle;

said first end of said body spaced from said second end of said body by a distance greater than said opening span;

a first connector disposed on said top of said body proximate said center portion;

a second connector disposed on said top of said body, said second connector spaced from said middle by a distance which is greater than the distance said first connector is spaced from said middle;

connecting said first connector of said lifting beam to said lifting arm;

connecting said second connector of said lifting beam to said second component of said heavy equipment;

orienting said lifting beam into an insertion orientation which is sufficiently vertical so that said beam can be lowered into the interior of said concrete dome without contacting said top opening;

changing the orientation of said lifting beam to a lifting orientation which is more horizontal than said insertion orientation by moving said second component; and raising said first connector to lift said lifting beam and the precast concrete dome.

18. A method of lifting a precast concrete dome according to claim 17 wherein said step of providing heavy equipment comprises providing a vertically movable lifting arm.

19. A method of lifting a precast concrete dome according to claim 17 wherein said step of providing heavy equipment comprises providing a lifting arm and a winch, and said step of connecting said first connector to said lifting arm comprises connecting said first connector to a flexible support connected to said winch.

20. A method of lifting a precast concrete dome according to claim 17 wherein said step of providing a lifting beam comprises providing a lifting beam with said first end and said second end comprising curved outer surfaces, each of said curved outer surfaces comprising an upper edge and a lower edge, said curved outer surfaces slope outwardly so that the distance between said upper edges of said curved outer surfaces is less than the distance between said lower edges of said curved outer surfaces.

* * * * *